(12) United States Patent
Ni et al.

(10) Patent No.: US 10,737,626 B2
(45) Date of Patent: Aug. 11, 2020

(54) FOLDING MECHANISM

(71) Applicant: Weixiang Tong, Jinhua (CN)

(72) Inventors: Xiaojun Ni, Jinhua (CN); Chengsheng Fang, Jinhua (CN); Weixiang Tong, Jinhua (CN)

(73) Assignee: FORCOME (ZHEJIANG) CO., LTD., Jinhua (CN)

( * ) Notice: Subject to any disclaimer, the term of this patent is extended or adjusted under 35 U.S.C. 154(b) by 0 days.

(21) Appl. No.: 16/293,798

(22) Filed: Mar. 6, 2019

(65) Prior Publication Data

US 2019/0351833 A1 Nov. 21, 2019

(30) Foreign Application Priority Data

May 17, 2018 (CN) .................... 2018 2 0733934 U

(51) Int. Cl.
*B60R 5/00* (2006.01)
*B60R 9/06* (2006.01)
*B60R 11/00* (2006.01)

(52) U.S. Cl.
CPC ................ *B60R 5/003* (2013.01); *B60R 9/06* (2013.01); *B60R 2011/0003* (2013.01); *B60R 2011/0082* (2013.01)

(58) Field of Classification Search
CPC . B60R 5/003; B60R 5/041; B60R 2011/0082; B60R 2011/0003; B60R 9/06; B60R 9/065
See application file for complete search history.

(56) References Cited

U.S. PATENT DOCUMENTS

| | | | | |
|---|---|---|---|---|
| 5,330,084 A * | 7/1994 | Peters | ....................... | B60R 9/06 211/171 |
| 5,370,285 A * | 12/1994 | Steelman | ............... | B62D 43/02 224/42.12 |
| 5,421,495 A * | 6/1995 | Bubik | ..................... | B60R 9/042 224/282 |
| 5,489,110 A * | 2/1996 | Van Dusen | ............... | B60R 9/06 224/507 |
| 5,775,560 A * | 7/1998 | Zahn | ......................... | B60R 9/06 224/485 |
| 5,938,395 A * | 8/1999 | Dumont, Jr. | .............. | B60R 9/06 224/497 |
| 6,129,371 A * | 10/2000 | Powell | ...................... | B60R 9/06 224/502 |
| 6,401,999 B1 * | 6/2002 | Hehr | ......................... | B60R 9/06 224/502 |
| 7,114,736 B2 * | 10/2006 | Stodola | ..................... | B60R 3/00 280/164.1 |

(Continued)

*Primary Examiner* — Stanton L Krycinski
(74) *Attorney, Agent, or Firm* — SZDC Law P.C.

(57) ABSTRACT

The application provides a folding mechanism. The folding mechanism comprises a fixing rod, a connecting seat and a U-shaped clamping piece which fixes the fixing rod and the connecting seat, wherein a pull rod which realizes rebound by a spring is arranged in the fixing rod, the pull rod penetrates through the fixing rod and is fixed with a handle, opposite strip pin holes and horizontal pin holes are arranged on the fixing rod and the U-shaped clamping piece, vertical pin holes are arranged on the U-shaped clamping piece at the same time as the horizontal pin holes, and arc-shaped through grooves are connected between the horizontal pin holes and the vertical pin holes.

2 Claims, 2 Drawing Sheets

(56) References Cited

U.S. PATENT DOCUMENTS

| | | | | |
|---|---|---|---|---|
| 7,316,339 | B2* | 1/2008 | Zhang | B60R 9/06 224/42.34 |
| 7,556,545 | B2* | 7/2009 | Draghici | B60P 3/1066 248/640 |
| 8,480,149 | B2* | 7/2013 | Durand | B60R 9/06 296/26.08 |
| 9,033,641 | B1* | 5/2015 | Barefoot | B60P 3/06 414/462 |
| 9,387,739 | B2* | 7/2016 | Babuska | B60D 1/54 |
| 9,694,758 | B1* | 7/2017 | Krolski | B60R 9/06 |
| 2008/0001052 | A1* | 1/2008 | Kalous | B60R 9/065 248/544 |
| 2010/0181357 | A1* | 7/2010 | Christianson | B60R 9/06 224/497 |

\* cited by examiner

FOLDING MECHANISM

The present application claims priority to Chinese Application No.: 201820733934.X, filed on May 17, 2018, which is incorporated by reference for all purposes as if fully set forth herein.

TECHNICAL FIELD

This application relates to a folding mechanism, in particular to a rack frame folding mechanism.

BACKGROUND ART

Luggage rack is a common device for transporting articles. Luggage racks are usually fixed at the rear of automobiles when in use. In order to facilitate use, existing luggage racks can be basically folded, thus shortening the length of luggage racks when not in use.

The existing folding mechanism for realizing the folding of the luggage rack is generally provided with two parallel clamping pieces at the rear end of the connecting seat, a horizontal pin hole is arranged at the front end of the two parallel clamping pieces, a fixed rod hinge hole is arranged at the rear end, a vertical direct pin hole is arranged below the fixed rod hinge hole, the fixed rod is hinged on the hinge hole of the connecting seat through bolts, a pin hole is arranged in front of the hinge position of the fixed rod, and a luggage frame is arranged behind the hinge position of the fixed rod. When the luggage frame is horizontal, the pin hole at the front end of the fixing rod below the luggage frame is fixed on the horizontal pin hole of the connecting seat through a bolt. When the luggage frame is turned upward around the hinge, the pin hole at the front end of the fixing rod is aligned with the vertical pin hole of the connecting seat and fixed through the bolt. However, the luggage frame of the existing common luggage rack is relatively high. In order to fold the luggage rack, a user can only pull out the bolt from the horizontal pin hole of the connecting seat after half a circle around the luggage rack to the front of the luggage rack, then wind back to turn the luggage rack, and then fix the luggage rack on the vertical pin hole of the connecting seat through the bolt, which is inconvenient to use.

CONTENT OF THE APPLICATION

In view of the defects of the existing folding mechanism, the technical problem to be solved by the application is to provide a folding mechanism which is very convenient to fold.

In order to achieve the above purpose, according to one aspect of the application, the application is realized by the following technical measures: a folding mechanism comprises a fixing rod, wherein the bottom opening of the fixing rod is hollow, a pull rod is arranged in the hollow fixing rod, one side of the pull rod passes through the top of the fixing rod and is connected with a handle, a spring is sleeved on the pull rod, one side of the spring is abutted against the inner top surface of the fixing rod, the other side of the spring is fixed by a resisting pin, and a strip pin hole is also formed in the position of the fixing rod close to the bottom; A U-shaped clamping body, wherein the U-shaped clamping body is clamped on the fixed rod and hinged with the fixed rod; two vertical surfaces of the U-shaped clamping body are respectively provided with a horizontal pin hole and a vertical straight pin hole; an arc-shaped through groove is connected between the horizontal pin hole and the vertical straight pin hole; after a pin shaft passes through the two horizontal pin holes and the strip pin hole between the two horizontal pin shafts, the pin shaft is fixed with the pull rod; a notch is also formed on the bottom surface of the U-shaped clamping body; and the notch is positioned at one side close to the fixed rod; And a connecting seat, wherein one side of the connecting seat is clamped in the U-shaped card body and is fixed with the U-shaped card body.

After the folding mechanism moves through the pin shaft, the pin shaft, the strip-shaped pin hole and the arc-shaped channel are opposite, and the fixing rod can be erected or lowered, thus being very convenient to adjust.

Furthermore, the pull rod is arranged against the inner side surface of the fixed rod, and the pull rod and the pin shaft are fixed through two rod bodies with oblique angles. The above design is to facilitate the hinge of the fixing rod and the U-shaped clamping body.

Compared with the prior art, the application has the advantages that when the rack frame fixed on the fixing rod is turned over, a user only needs to operate on one side of the rack, does not need to walk back and forth around the rack, and is very convenient to use.

BRIEF DESCRIPTION OF DRAWINGS

The attached drawings forming part of the application are used to provide a further understanding of the application. The illustrative embodiment of the application and its description are used to explain the application and do not constitute improper limitation of the application. In the drawings.

Figure 1:
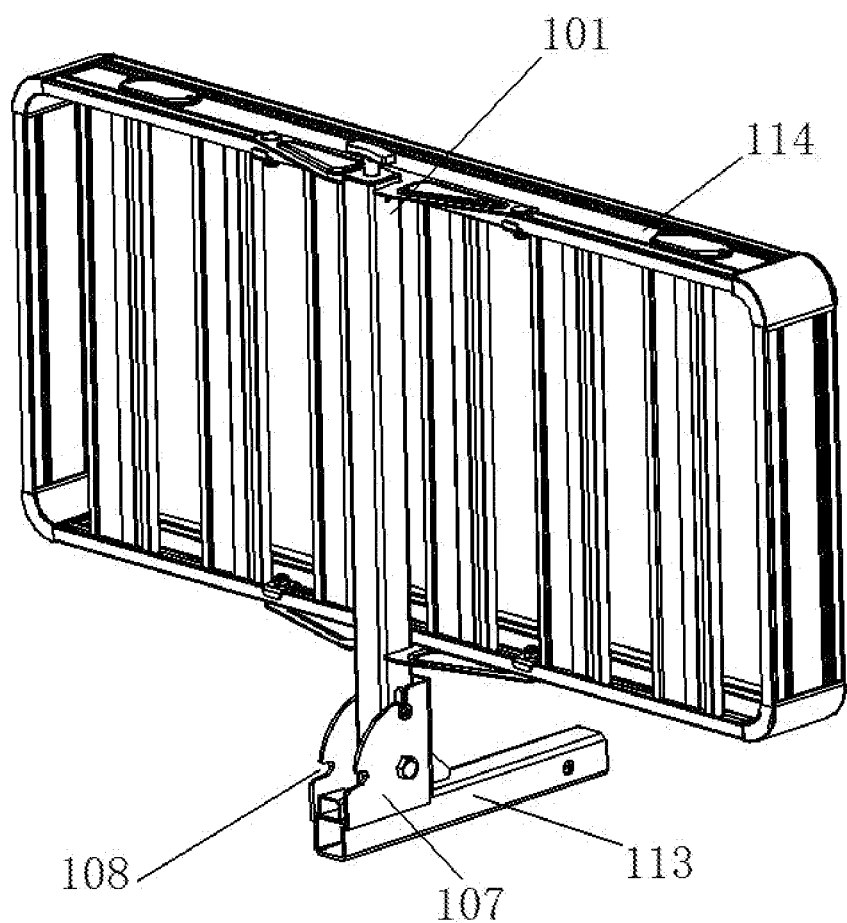
FIG. 1 is a structural schematic diagram of a folding mechanism described in the application.

Reference numeral: 101, Fixing Rod; 102. Pull Rod; 103. Handle; 104. Spring; 105. Resist the Pin; 106. Strip Pin Hole; 107. U-Shaped Clamping Pieces; 108, Horizontal Pin Hole; 109. Vertical Straight Hole; 110. Arc-Shaped Through Slot; 111. Pins; 112. Gap; 113. Connecting Seat; 114. Luggage Box.

DETAILED DESCRIPTION OF THE PREFERRED EMBODIMENT

Hereinafter, the application will be described in detail with reference to the drawings and with reference to embodiments. It should be noted that the embodiments in this application and the features in the embodiments can be combined with each other without conflict.

In the description of the application, it should be understood that the orientation or positional relationship indicated by the terms "center," "upper," "lower," "left," "right," "vertical," "horizontal," "inner," "outer," "bottom" and "top" are based on the orientation or positional relationship shown in the drawings, only for convenience of description of the application and simplification of description, and do not indicate or imply that the indicated device or element must have a specific orientation, be constructed and operated in a specific orientation, and therefore cannot be understood as a limitation of the application.

Example 1

Figure 2:
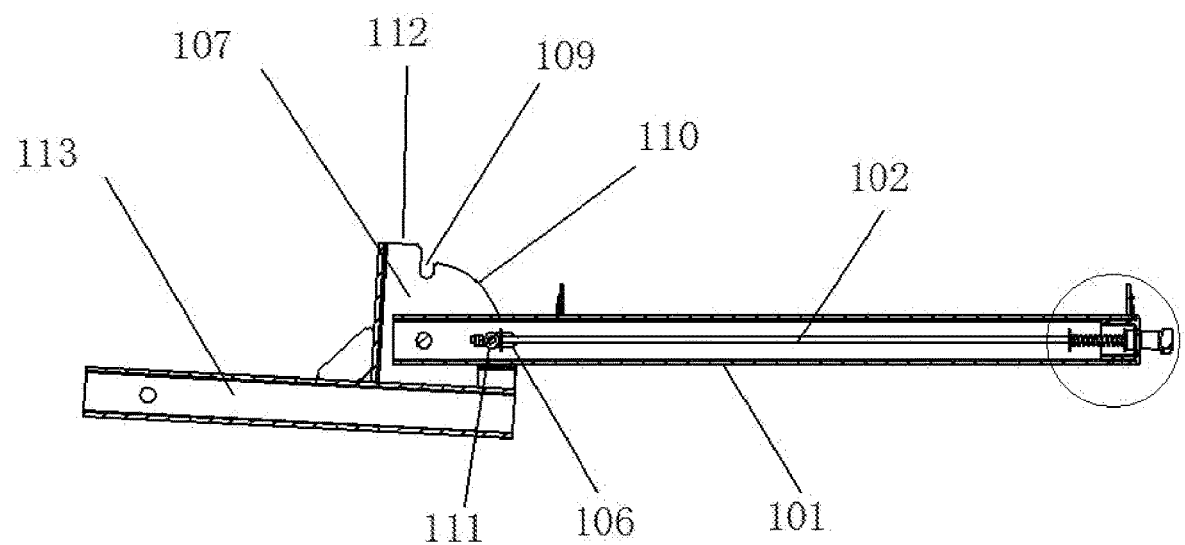
FIG. 2 is a semi-sectional schematic view of a folding mechanism described in the application.
Figure 3:
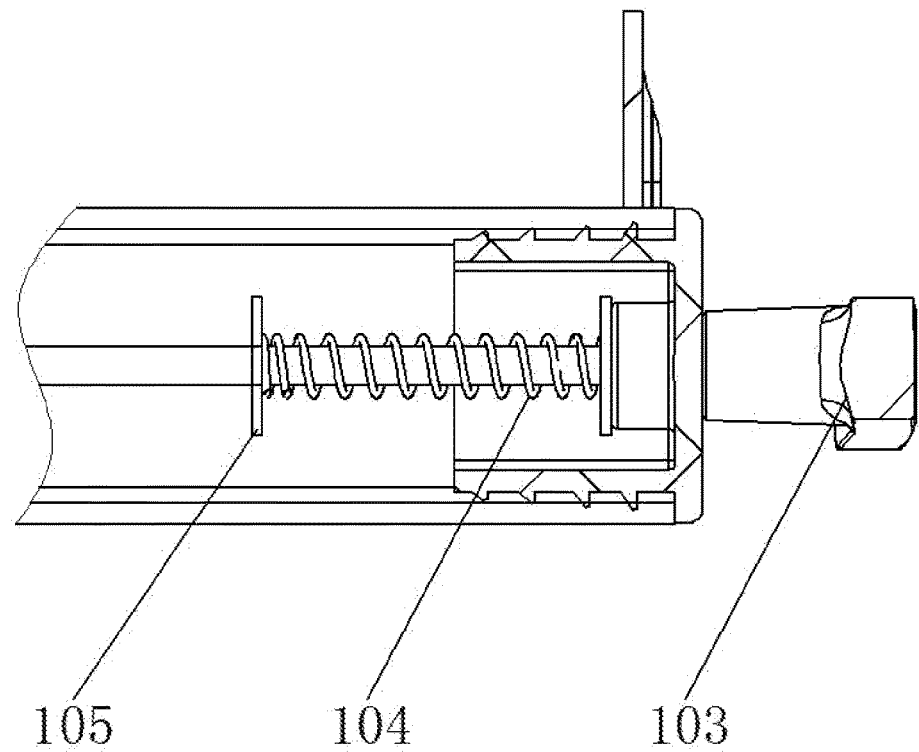
FIG. 3 is an enlarged schematic view at A-A in FIG. 2.

Referring to FIG. 1, a folding mechanism provided in this embodiment includes a fixing rod 101, a U-shaped clamping body 107, and a connecting seat 113, wherein the fixing rod 101 is a square rod, the bottom opening of the fixing rod 101 is hollow, the U-shaped clamping body 107 is connected with the bottom of the fixing rod 101, the connecting seat 113 is connected with the front side of the U-shaped clamping body 107, and the fixing rod 101 is also fixed with a luggage frame 114;

As further explained with reference to FIGS. 2 and 3, the hollow fixing rod 101 is internally provided with a pull rod 102, the right side of the pull rod 102 penetrates through the side opposite to the opening side of the fixing rod 101, that is, the top of FIG. 1, the pull rod 102 penetrating through the fixing rod 101 is fixed with a handle 103, and a spring 104 is sleeved on the pull rod 102 in the fixing rod 101, and the right side of the spring 104 abuts against the inner top surface of the fixing rod 101. The left side of the spring 104 is fixed with the pull rod 102 through a blocking pin 105, the side surface of the left side of the fixing rod 101 close to the bottom is also provided with a horizontally arranged strip pin hole 106, further, the U-shaped clamping body 107 is clamped on the left side of the fixing rod 101, the U-shaped clamping body 107 is hinged and fixed with the fixing rod 101, and the vertical surface of the U-shaped clamping body 107 is provided with a horizontal pin hole 108 which is horizontal to the strip pin hole 106; The vertical surface of the U-shaped clamping body 107 is also provided with a vertical pin hole 109 which is vertical to the horizontal pin hole 108, a certain distance exists between the horizontal pin hole 108 and the vertical pin hole 109, and an arc-shaped through groove 110 is connected between the horizontal pin hole 108 and the vertical pin hole 109. A pin shaft 111 passes through the horizontal pin holes 108 on the two vertical surfaces of the U-shaped clamping body 107 and the strip pin holes 106 between the two horizontal pin holes 108 and is connected with the pull rod 102 in the fixing rod 101. Further, the left side of the U-shaped clamping body 107 is clamped and fixed with the connecting seat 113, and a notch 112 is formed on the left horizontal surface of the U-shaped clamping body 107. The role of the notch 112 is to enable the fixing rod 101 to stand up while the left side of the connecting seat 113 is connected with the tail of the automobile.

According to the folding mechanism provided by the embodiment, when the fixing rod 101 is horizontal, the strip pin hole 106 of the fixing rod 101 coincides with the horizontal pin hole 108 of the U-shaped clamping piece 107, the pin shaft 111 at one end of the pull rod 102 is positioned in the overlapped horizontal pin hole 108 and the strip pin hole 106, and the luggage frame 114 is horizontally fixed. When the luggage frame 114 fixed on the fixing rod 101 needs to be turned over, the user grasps the handle 103 and stretches out of the fixing rod 101. The pin shaft 111 connected with the pull rod 102 is moved towards the arc-shaped through slot 110, and when the pin shaft 111 is opposite to the arc-shaped through slot 110, the luggage frame 114 is turned upward to make the bar pin hole 106 horizontal with the arc-shaped through slot 110, so that the pin shaft 111 can slide downward along the arc-shaped through slot 110. After sliding to the vertical pin hole 109 of the U-shaped card body 107; The pull rod 102 drives the pin shaft 111 to enter the bottom of the vertical straight pin hole 109 under the push of the spring 104, and the luggage frame 114 is vertically fixed and folded. The user only needs to operate behind the luggage frame 114 in the whole process of turning and folding the luggage rack, does not need to walk back and forth around the luggage frame 114, and is very convenient to use.

The above description is only the preferred embodiment of the application and is not intended to limit the application. For those skilled in the art, the invention can be changed and changed. Any modification, equivalent substitution, improvement, etc. made within the spirit and principle of the application shall be included in the protection scope of the invention.

The invention claimed is:

1. A folding mechanism consisting of:
    a fixing rod, wherein a bottom opening of the fixing rod is hollow, a pull rod is arranged in the fixing rod, one side of the pull rod passes through a top of the fixing rod and is connected with a handle, a spring is sleeved on the pull rod, one side of the spring abuts against an inner top surface of the fixing rod, the other side of the spring is fixed by a resisting pin, and a strip pin hole is also formed in a position of close to the bottom of the fixing rod;
    a luggage frame, the luggage frame connected to the fixing rod;
    a pin shaft, the pine shaft having a circular shape;
    a U-shaped clamping body, wherein the U-shaped clamping body is clamped on the fixing rod and hinged with the fixing rod; two vertical surfaces of the U-shaped clamping body are each provided with a horizontal pin hole and a vertical pin hole; an arc-shaped through groove is connected between the horizontal pin hole and the vertical pin hole; after the pin shaft passes through two horizontal pin holes and a strip pin hole between the two horizontal pin holes, the pin shaft is fixed with the pull rod;
    a bottom surface of the U-shaped clamping body is also provided with a notch, and the notch is formed next to the vertical pin hole and enables the fixing rod to stand up when the folding mechanism is connected to an automobile;
    a connecting seat, one side of which is clamped in the U-shaped clamping body and fixed with the U-shaped clamping body.

2. A folding mechanism according to claim 1, wherein the pull rod is arranged against the inner side of the fixing rod, and the pull rod and the pin shaft are connected.

* * * * *